(12) United States Patent
Tam

(10) Patent No.: US 11,800,950 B2
(45) Date of Patent: Oct. 31, 2023

(54) MULTI SPOUT LATTE ART PITCHER

(71) Applicant: Anita Tam, The Woodlands, TX (US)

(72) Inventor: Anita Tam, The Woodlands, TX (US)

( * ) Notice: Subject to any disclaimer, the term of this patent is extended or adjusted under 35 U.S.C. 154(b) by 0 days.

(21) Appl. No.: 16/630,432

(22) PCT Filed: Sep. 4, 2019

(86) PCT No.: PCT/US2019/049600
§ 371 (c)(1),
(2) Date: Jan. 11, 2020

(87) PCT Pub. No.: WO2021/045752
PCT Pub. Date: Mar. 11, 2021

(65) Prior Publication Data
US 2022/0192418 A1    Jun. 23, 2022

(51) Int. Cl.
*A47J 31/44*    (2006.01)
(52) U.S. Cl.
CPC .................................. *A47J 31/4496* (2013.01)
(58) Field of Classification Search
CPC .... A47J 41/0094; A47J 31/4496; A47J 31/44; A47G 23/0216; A47G 2023/0291; A47G 21/145; A47G 19/12; A47G 19/14
USPC .......................................................... 99/275
See application file for complete search history.

(56) References Cited

U.S. PATENT DOCUMENTS

| 5,222,656 | A | * | 6/1993 | Carlson | B65D 81/3876 |
| | | | | | 220/738 |
| 6,755,328 | B1 | * | 6/2004 | Franco | A47G 19/12 |
| | | | | | 222/572 |
| 2007/0151979 | A1 | * | 7/2007 | Klump | B65D 43/20 |
| | | | | | 220/912 |
| 2016/0286994 | A1 | * | 10/2016 | Felty | A47G 23/0216 |
| 2017/0231414 | A1 | * | 8/2017 | Moon | A47J 19/025 |
| | | | | | 99/492 |

FOREIGN PATENT DOCUMENTS

DE          202019101029       *  3/2019  .............. A47J 31/44

* cited by examiner

*Primary Examiner* — Phuong T Nguyen
(74) *Attorney, Agent, or Firm* — Kevin M. Jones & Associates

(57) ABSTRACT

A multi spout pitcher, each spout having differing physical characteristics allows a user/barista to control the flow stream and energy transfer in mixing liquids to create a mixed beverage and produce a visual design on the beverage surface.

12 Claims, 3 Drawing Sheets

MULTI SPOUT LATTE ART PITCHER

CROSS-REFERENCE TO RELATED APPLICATIONS

This application claims priority under 35 U.S.C. § 119(e) from U.S. Provisional Patent Application No. 52/795,732 by Anita Tam, "Multiple Spout Art Pitcher" filed 23 Jan. 2019; which, by this statement, is incorporated herein by reference for all purposes.

BACKGROUND OF THE INVENTION

Latte Art is an embellishment created by the decorative application of microfoam to a beverage to create a pleasing design or pattern on the liquid's surface. Generally, microfoam is made by steaming milk to denature it. The steam heats, aerates, and slightly thickens the milk, producing microscopic, uniform bubbles as a shiny foam, i.e. a microfoam.

The milk/microfoam mixture is traditionally added to sweeten and aerate an espresso base producing the unique texture and taste of a Latte, thus the name Latte Art. However, one skilled in the art would appreciate that the innovations described herein are equally applicable to embellished beverages created with any variety of creams, milks, coffees, chocolates, teas, etc.

For simplicity, the description herein references a base of dark-colored espresso (the base) embellished by combining contrasting light-colored steamed milk/microfoam (milk/foam or foam). There are two forms of Latte Art distinguished by the process of creating the final beverage.

Free pouring creates an embellishment by controlling the flow of milk/foam as it is poured into the base, resulting in a design/pattern/embellishment (the embellishment) on the surface of the final beverage. Etching creates an embellishment by use of a tool, often a stirrer, pin, or pipette to manipulate or add/position foam on the surface of an espresso/milk mixture resulting in the final beverage with surface embellishment.

Latte Art creates a beverage of 'espresso and milk' (the 'Latte' part) through 'creative and technical' preparation (the 'Art' part) in a way that A) sufficiently mixes the components, aerating the resulting beverage to yield a pleasing consistency and taste; while simultaneously B) controlling the energy transfer blending the components to create a heterogeneous composition as an artistic medium; which is C) manipulated in an artistic manner to yield a pleasing visual presentation.

Free pouring involves controlling the flow of milk and microfoam as it is poured into the espresso or coffee base. The controlled pouring of Latte Art requires transferring the desired quantity of milk to sweeten the final beverage and mixing a portion of the microfoam to aerate the final beverage, while also preserving and positioning additional portions of microfoam to yield pleasing artistic visual embellishments on the final beverage's surface.

To achieve proper taste and consistency, the milk and foam is poured straight into the cup generating the energy transfer required to mix the components. To embellish, energy must be diminished to separate milk and foam; the milk sinking, leaving the foam on the surface. A pour stream's volume and energy contribute to surface turbulence that may pull foam below the surface, dissipate the foam across the surface, or float the foam in heaping mounds held together by its liquid tension and sugar/fat structure.

Latte Art not only enhances visual quality of a beverage, but also displays a barista's skill at controlling flow, demonstrates honed craft experience, and can be used as an artistic signature, or to designate/distinguish specific beverage orders. First popularized by baristas creating lattes, Latte Art has now expanded to include microfoam embellishments of other beverages as a unique artistic medium, but is still generally referred to as 'Latte Art.'

DETAILED DESCRIPTION OF THE PREFERRED EMBODIMENTS

Figure 1:
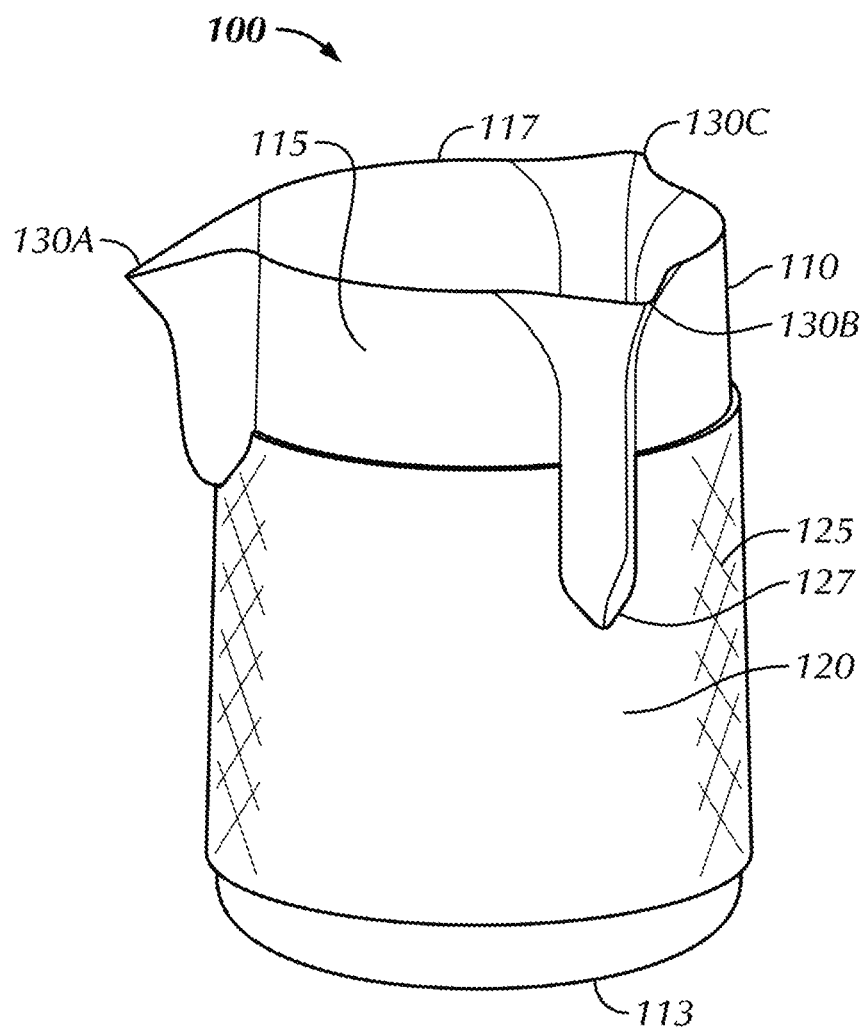
FIG. 1 is a perspective view of a multi spout latte art pitcher in accordance with an exemplary embodiment of the innovation.

The innovation described herein is a pour pitcher with, inter alia, a plurality of shaped spouts for controlling the stream of liquid/foam introduction into a beverage base. Controlling the pour stream produces various characteristic mixing actions with less critical manipulation requirements. A plurality of shaped spouts provides options for an artist to use similar control techniques on varying spouts to yield varying pour streams.

The espresso/milk/foam combining or mixing (that is, the milk/foam separation and foam dissipation) are dependent on transfer of energy from the stream of milk/foam into the espresso beverage base. Fluid dynamics, Bernoulli's principle and specifically Navier-Stokes equations can quantify the effects of spout shape on the volume and velocity of the resulting stream from the spout. However, the effects being common knowledge in the industry and easily observable, such calculation and quantifying of physical attributes is beyond the scope of this specification.

The assertions of importance herein are as follows. All characteristics of a vessel's shape, pour angle, volume, etc. being constant, and all characteristics of a fluid's viscosity, quantity, temperature, composition, etc. also being constant: varying the characteristics of the vessel's spout, from which the fluid is exiting (being poured), will affect the physical characteristics of the resulting stream.

That is, all other variables of the system being constant, varying a physical characteristic of the spout, (e.g. the curvature) will affect the resulting stream's shape near the spout tip (and outward to the distance traveled before surface tension equalizes). The varying of shape, volume, and velocity of the exiting fluid being thus changed will vary the energy transfer of the components.

Distributing a plurality of spouts around the upper rim of a pouring pitcher/vessel each having varied physical characteristics will allow the production of varying streams with desired energy transfer characteristics for various aspects of creating Latte Art. Changing the depth of a spout primarily alters the velocity of its stream. Changing the cross-sectional area of a spout primarily alters the volume of its stream. Changing the curvature/opening of a spout primarily alters the size and/or initial shape of its stream.

In the preferred embodiment the vessel is constructed of stainless steel or another suitable non-corrosive material. The vessel's side walls are at least six (6) inches high, and the vessel has a volume of at least four (4) fluid ounces and a rim diameter of at least three (3) inches.

One skilled in the art would appreciate that alternative materials may be utilized, but should be non-corrosive, and have conduction properties to allow thermal manipulation of the vessel's contents. Sizes and dimensions may also vary but should accommodate a volume of microfoam production sufficient for at least one complete beverage preparation, and optionally may allow multiple simultaneous beverage preparations.

The vessel of the preferred embodiment has three spouts, substantially equally spaced around the upper rim. One skilled in the art may appreciate that increased pour control may allow more spouts to be closer spaced and utilized without interference there between. Further, lesser spouts may be positioned closer together to limit rotating necessary to reposition the vessel.

Spouts of the preferred embodiment are formed of the vessel's side wall and are open to the inside of the vessel. In an alternative embodiment spouts may be affixed to the outside of the vessel's side wall, being an interior side wall to the spout with openings through the side wall to the interior of the spout. The openings may further comprise strainers, screens, or filters. An alternative embodiment may comprise specific spouts for producing certain designs.

In another embodiment, one or more spouts may have a cover/lid which may also function as a skimmer/separator, or may reinforce/support, larger or more complex spout shapes. In another embodiment, a spout's curvature may comprise a plurality of apexes to produce a plurality of simultaneous streams, which may or may not be substantially identical.

Each spout may further comprise a lip extending outward from the spout's curvature suppressing unintentional drip and stream flow back external to the spout during pouring. The spout's curvature may also be angled above or below the level of the vessel's upper rim to alter the vessel's required tilt for pouring.

The pouring pitcher further comprises a sleeve of insulating material to protect against heat and retain content's warmth. The sleeve is notched along the upper edge to interface with the lower end of a vessel's plurality of spouts, preventing rotation, and providing a tactile guidance of orientation.

In the preferred embodiment, the sleeve is compressible and/or textured for additional grip. The sleeve is open on the bottom and terminates above the bottom of the vessel to allow thermal transfer from contents, through the vessel body, specifically the bottom, to a warming plate, or cooling block for temperature manipulation.

By using the innovation described a barista/artist/user can froth milk to create microfoam in the vessel/pitcher, then use a hot plate or a cooling surface to adjust the temperature, or to maintain temperature during extended use, such as for multiple preparations. The vessel sleeve makes the pitcher easy to hold by providing thermal insulation and grip while the notches/spout interfacing configuration prevents slipping/rotating and provides tactile feedback for positioning.

The plurality of spouts provides different stream characteristics allowing complex artistic designs to be produced with a single vessel. By using flow control an experienced barista/user can create many more streams to increase complexity of the resulting Latte Art.

DETAILED DESCRIPTION OF THE DRAWINGS

FIG. 1 is a perspective view of a multi spout latte art pitcher in accordance with an exemplary embodiment of the innovation. The pouring pitcher or vessel (100) has a generally hollow cylindrical shaped body (110) comprised of a cylindrical side wall (115) extending upward from a substantially flat circular bottom (113). The side wall (115) of the vessel (100) having a plurality of spouts (130) spaced at or near the vessel's (100) upper rim (117) and generally opening upward and outward with respect to a central axis of the vessel body (110).

The side wall (115) of the vessel (100) is encircled with a sleeve (120) having an inner diameter substantial the same as the vessel (100) side wall's (115) outer diameter. A plurality of notches (127) in the sleeve's (120) upper rim correspond to the spouts (130). The sleeve (120) is comprised of a thermal insulating material (125) and has a compressibility or a textured outer surface (127) for gripping and controlling the vessel (100).

Figure 2:
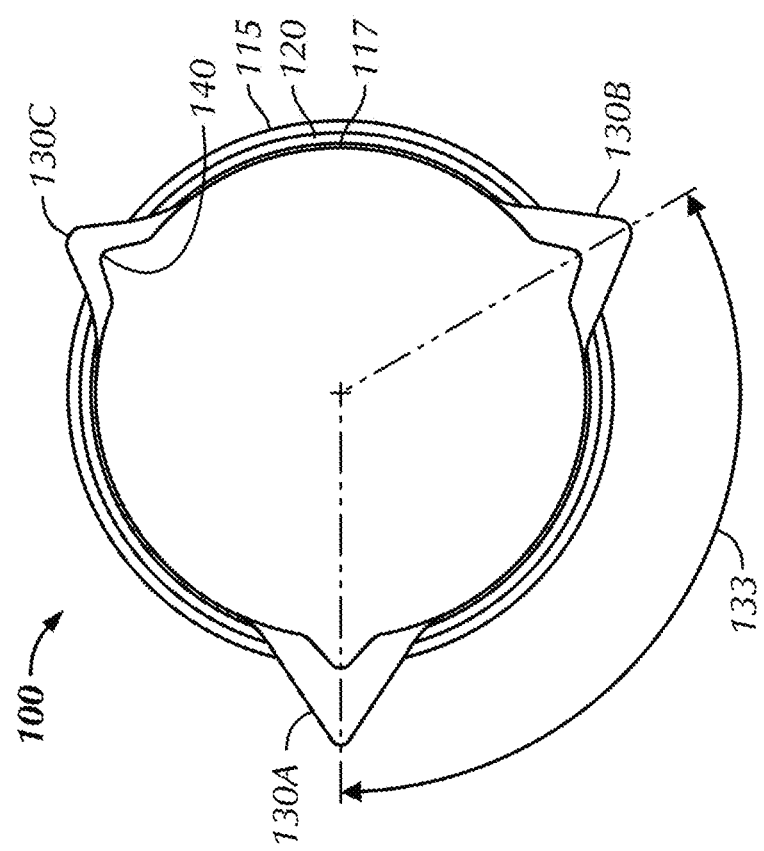
FIG. 2 shows a top view of a multi spout latte art pitcher in accordance with an exemplary embodiment of the innovation.

FIG. 2 shows a top view of a multi spout latte art pitcher in accordance with an exemplary embodiment of the innovation. The vessel's (100) side wall (115) is circumferentially enclosed by a sleeve (115) that is thermally insulating, textured, and/or grip enhancing.

The upper rim (117) of the vessel (100) has dispersed thereon, a plurality of spouts (130). The spacing between spouts (133) being sufficient for pouring the vessel's (100) contents from a particular spout (130) without interference from adjacent spouts (130). Each spout (130) having a unique shape (140) and producing a stream having unique physical properties for the creation of Latte Art.

In the preferred embodiment the three spouts (130) are evenly spaced (133) 120° apart. Spouts are formed from the vessel's (100) side wall (115) material, by essentially deforming the side wall's (115) upper rim generally outward. The spouts (130) vary in curvature, depth, and cross-sectional area, resulting in varying shape, pressure, and velocity of the streams produced there from.

Figure 3:
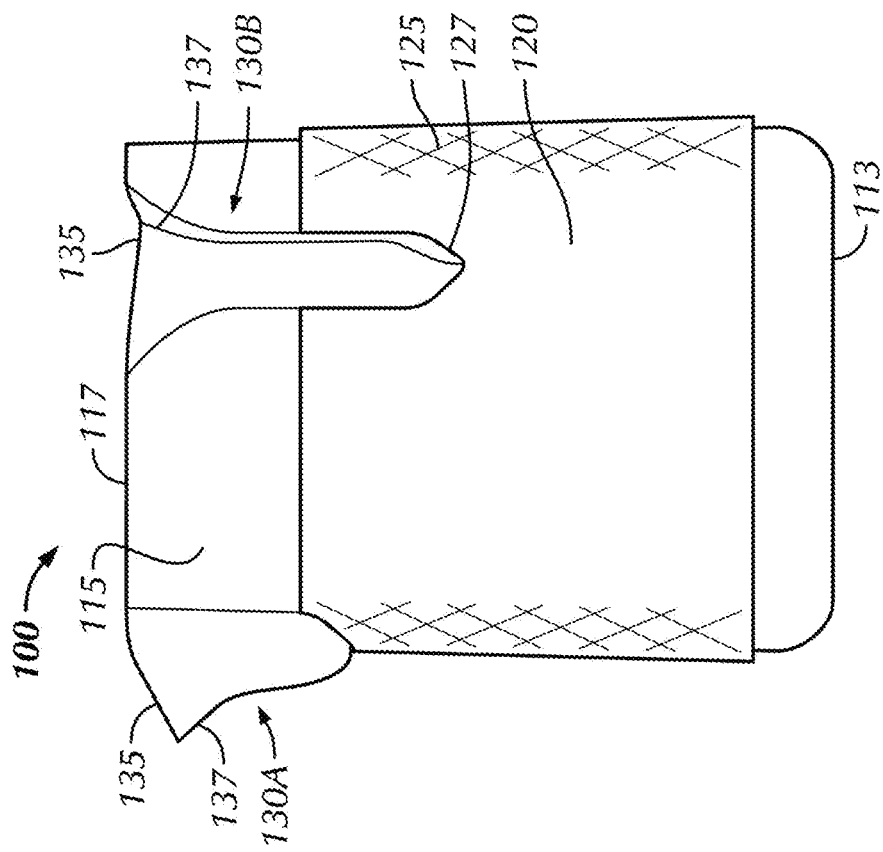
FIG. 3 shows a side view of a multi spout latte art pitcher in accordance with an exemplary embodiment of the innovation.

FIG. 3 shows a side view of a multi spout latte art pitcher in accordance with an exemplary embodiment of the innovation. The vessel (100) has a plurality of spouts (130) spaced (133) around the circumference of the upper rim (117). The spout's (130) lower vertexes being mated with adjacent notches (127, not indicated) in the upper edge of the sleeve (120).

Each of the plurality of spouts (130) further comprises a lip for urging or biasing the angle of pour, related to the velocity of the stream; and/or suppressing unintentional drip and flow back along the external surfaces of the vessel (100). The lip of each spout comprises an angle of deflection (137) from perpendicular to the vessel's central axis, and an angled of extension (135) from the spout's (130) longitudinal extension parallel to the vessel axis, or angle of extension (137).

Each spout (130) may further comprise a lip extending outward from the spout's (130) curvature (137) suppressing unintentional drip and stream flow back external to the spout (130) during pouring. The spout's (130) curvature (137) may also be angled (130) above or below the level of the vessel's upper rim (117) to alter the vessel's (100) pouring angle.

The specific shapes of the plurality of spouts (130) referenced in the previous drawings are not specific to the innovation describe herein but are presented as exemplary representations. For illustrative purposes, FIGS. 4, 5 and 6 are described in detail below.

The initial shape of the stream resulting from the spout (130A) is affected by the shape/curvature (143) of the spout's (130A) pouring vertex, and the pressure/velocity of the stream, which are affected by the volume (145) and depth (147) of the spout's (130) longitudinal extending component.

Generally, a spout (130) has an outer pouring component/shape, described as the spout's curvature (143) and a longitudinally extending component. The longitudinal component's volume (145), generally defined by the cross-sectional areas; and depth (147), defined by the length and shape of the spout; affect the pressure and velocity of the spout's stream.

Figure 4A:
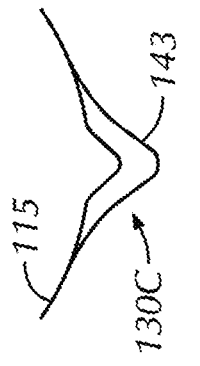
FIG. 4A is a top view of an embodiment of a first spout for a latte art pitcher in accordance with an exemplary embodiment of the innovation.

FIG. 4A is a top view of an embodiment of a first spout for a latte art pitcher in accordance with an exemplary embodiment of the innovation. The spout (130A) illustrated is formed from the side wall (115) of the vessel (100, not labeled), and has an outer pouring component/exit shape, designated as the curvature (143) and a longitudinally extending component, comprising the spout's pouring well. The initial shape of the stream resulting from the spout (130A) is affected by the shape/curvature (143) of the spout's (130A) pouring vertex.

Figure 4B:
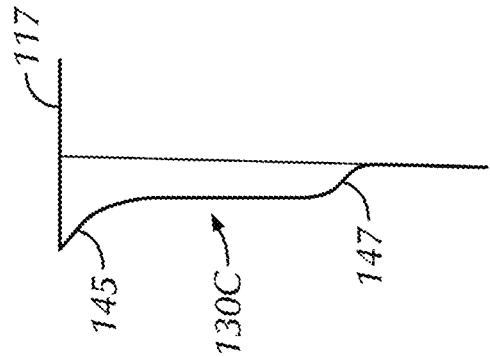
FIG. 4B is a side view of the embodiment of the first spout illustrated in FIG. 4A.

FIG. 4B is a side view of the embodiment of the first spout illustrated in FIG. 4A. The side view illustrated of the spout (130A) shows the well of the longitudinal component, which is characterized by volume (145) and depth (147) that affect the resulting pour stream. The spout angle (135) of deflection from the vessel's (100, not indicated) upper rim (117) influences pouring angle, which combined with the volume of vessel contents to influence stream characteristics.

Figure 5A:
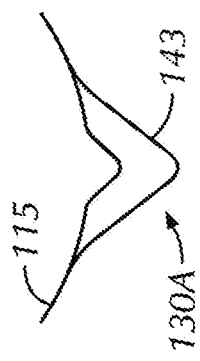
FIG. 5A is a top view of an embodiment of a second spout for a latte art pitcher in accordance with an exemplary embodiment of the innovation.

FIG. 5A is a top view of an embodiment of a second spout for a latte art pitcher in accordance with an exemplary embodiment of the innovation. The second spout (130B) illustrated differs from the others by having a different curvature (143) which has a profound effect on a pour stream's initial shape.

Figure 5B:
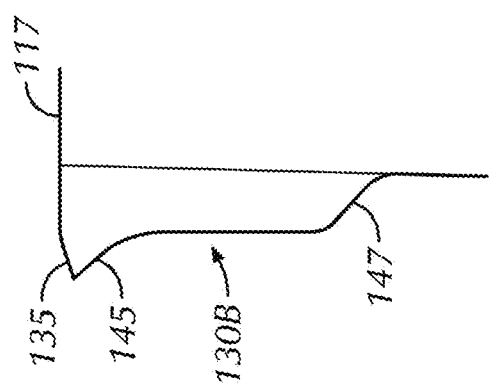
FIG. 5B is a side view of the embodiment of the second spout illustrated in FIG. 5A.

FIG. 5B is a side view of the embodiment of the second spout illustrated in FIG. 5A. Changing the longitudinal component of the second spout (130B), characterized by volume (145), depth (147), and angle (135) affect the resulting pour stream characteristics, allowing a barista to achieve differing artistic results.

Figure 6A:
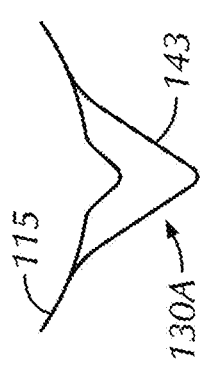
FIG. 6A is a top view of an embodiment of a third spout for a latte art pitcher in accordance with an exemplary embodiment of the innovation.

FIG. 6A is a top view of an embodiment of a third spout for a latte art pitcher in accordance with an exemplary embodiment of the innovation. The third spout (130C) illustrated differs from the others by having a different curvature (143) which has a profound effect on a pour stream's initial shape.

Figure 6B:
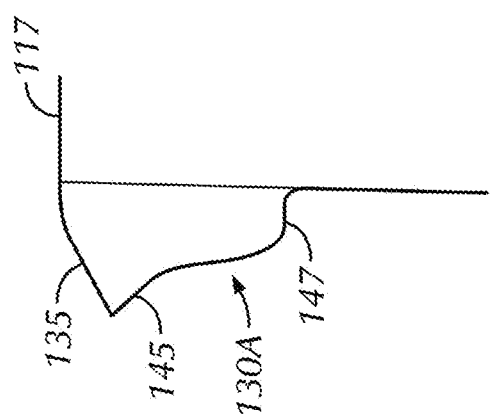
FIG. 6B is a side view of the embodiment of the third spout illustrated in FIG. 6A.

FIG. 6B is a side view of the embodiment of the third spout illustrated in FIG. 6A. Changing the longitudinal component of the third spout (130C), characterized by volume (145), depth (147), and angle (135) affect the resulting pour stream characteristics, allowing a barista to achieve differing artistic results.

The diagrams in accordance with exemplary embodiments of the present innovation are provided as examples and should not be construed to limit other embodiments within the scope of the innovation. For instance, heights, widths, and thicknesses may not be to scale and should not be construed to limit the innovation to the particular proportions illustrated. Some elements illustrated in the singularity may actually be implemented in a plurality. Further, some element illustrated in the plurality could actually vary in count. Further, some elements illustrated in one form could actually vary in detail. Specific physical characteristics and numerical data should be interpreted as illustrative for discussing exemplary embodiments. Such specific information is not provided to limit the innovation.

The above discussion is meant to be illustrative of the principles and various embodiments of the present innovation. Numerous variations and modifications will become apparent to those skilled in the art once the above disclosure is fully appreciated. It is intended that the following claims be interpreted to embrace all such variations and modifications.

What is claimed is:

1. A latte art pouring pitcher comprising:
    a vessel for holding liquid, having a sidewall extending upward from an enclosed bottom end;
    the sidewall having a plurality of spouts, distal to the bottom end,
        the plurality of spouts further comprising:
            three spouts evenly dispersed around the sidewall;
            each having different physical characteristics that uniquely alter streams of liquid poured therefrom and
    a thermally insulating sleeve encompassing the sidewall terminating above the bottom of the vessel.

2. The pouring pitcher, as described in claim 1 further comprising:
    the thermally insulating sleeve having notches in an upper rim matching the lower vertices of each spout.

3. The pouring pitcher, as described in claim 2 wherein the notches in the thermally insulating sleeve
    engage the lower vertices of the spouts; and
    prevent rotational movement of the vessel relative to the thermally insulating sleeve.

4. The pouring pitcher, as described in claim 1, wherein the thermally insulating sleeve is textured.

5. The pouring pitcher, as described in claim 1, wherein the thermally insulating sleeve is removable.

6. The pouring pitcher, as described in claim 5, wherein the thermally insulating sleeve engages the vessel preventing rotational movement of the vessel relative to the thermally insulating sleeve.

7. The pouring pitcher, as described in claim 1 wherein, an upper rim of the spout is deflected from an upper rim of the pitcher.

8. The pouring pitcher, as described in claim 1 wherein, an upper rim of the spout extends outward to form a lip.

9. The pouring pitcher, as described in claim 1, wherein one or more spouts of the plurality of spouts further comprises:
    a plurality of apexes for pouring a plurality of simultaneous liquid streams from the spout.

10. A method of creating latte art comprising:
    having a serving vessel holding a primary liquid;
    having a pouring pitcher comprising:
        a sidewall extending upward from, an enclosed bottom end,
a plurality of spouts distal the bottom end;
the pouring pitcher holding a secondary liquid,
aerating the secondary liquid to produce a microfoam;
pouring controlled streams of the secondary liquid from one or more of the plurality of spouts of the pitcher to the serving vessel;
mixing the liquids; and
forming an artistic image on the surface of the mixed liquids in the serving vessel.

11. The method described in claim 10 wherein pouring controlled streams further comprises:
identifying one of the plurality of spouts;
adjusting the height of the spout to the serving vessel; or
tilting the pouring pitcher to affect the mixing by altering the transfer of energy between the liquids.

12. The method described in claim 10 wherein pouring controlled streams further comprises:
feeling the shape of the pitcher and position of the spouts of the pitcher to control the streams of liquid poured from the pitcher.

\* \* \* \* \*